(12) United States Patent
Glover

(10) Patent No.: US 11,870,595 B2
(45) Date of Patent: Jan. 9, 2024

(54) METHOD AND TEST DEVICE FOR PERFORMING PACKET ERROR RATE MEASUREMENT

(71) Applicant: Rohde & Schwarz GmbH & Co. KG, Munich (DE)

(72) Inventor: Brian Glover, Aldershot (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/410,130

(22) Filed: Aug. 24, 2021

(65) Prior Publication Data

US 2023/0060748 A1  Mar. 2, 2023

(51) Int. Cl.
*H04L 1/20* (2006.01)
*H04W 24/06* (2009.01)
*H04W 4/80* (2018.01)

(52) U.S. Cl.
CPC ............ *H04L 1/203* (2013.01); *H04W 4/80* (2018.02); *H04W 24/06* (2013.01)

(58) Field of Classification Search
CPC .......... H04L 1/203; H04W 4/80; H04W 24/06
See application file for complete search history.

(56) References Cited

U.S. PATENT DOCUMENTS

| | | | |
|---|---|---|---|
| 10,616,743 B2 | 4/2020 | Wojcieszak et al. | |
| 10,966,047 B1* | 3/2021 | Tong ...................... | H04R 5/033 |
| 11,438,714 B2* | 9/2022 | El-Hoiydi ........... | H04M 1/6066 |
| 2017/0244576 A1* | 8/2017 | Batra ................ | H04W 56/0025 |
| 2019/0387382 A1 | 12/2019 | Wojcieszak et al. | |
| 2021/0376884 A1* | 12/2021 | Linsky ..................... | H04B 5/06 |
| 2022/0256286 A1* | 8/2022 | Gu .......................... | H04W 4/08 |
| 2022/0345241 A1* | 10/2022 | Sun ....................... | H04L 1/0002 |
| 2022/0390580 A1* | 12/2022 | Bonde ..................... | H04R 1/08 |

FOREIGN PATENT DOCUMENTS

| | | |
|---|---|---|
| EP | 3 808 115 A1 | 4/2021 |
| WO | 2019/245670 A1 | 12/2019 |
| WO | 2020/124610 A1 | 6/2020 |
| WO | 2020/124611 A1 | 6/2020 |

* cited by examiner

*Primary Examiner* — Hashim S Bhatti
(74) *Attorney, Agent, or Firm* — Westman, Champlin & Koehler, P.A.

(57) ABSTRACT

The invention provides an analysis of a Bluetooth Low Energy implementation by measuring a packet error rate (PER) on a communication channel between the BLE implementation and a test device.

11 Claims, 4 Drawing Sheets

METHOD AND TEST DEVICE FOR PERFORMING PACKET ERROR RATE MEASUREMENT

TECHNICAL FIELD

The present invention relates to a method and a test device for performing packet error rate measurement. In particular, the present invention relates to measurement of a packet error rate on a Bluetooth Low Energy channel.

BACKGROUND

Bluetooth Low Energy (BLE) is a new wireless communication technology published by the Bluetooth special interest group (SIG) as component of Bluetooth core specification version 4.0. BLE is a low power, low complexity and lower cost wireless communication protocol, designed for applications requiring lower data rates and lower duty cycles. BLE technology is aimed at devices requiring low power consumption, for example devices that may operate with small batteries. BLE can also be incorporated into devices such as mobile phones, smartphones, tablet computers, laptop computers or desktop computers.

During development or production of devices with a BLE implementation, specific tests have to be performed. Such tests are needed to make sure that the BLE device complies with the desired requirements.

SUMMARY

Against this background, there is a need for measurement of error rates, in particular a packet error rate (PER) on a communication link established by a BLE implementation. Especially, there is a need for PER measurement on BLE isochronous channels established by a BLE implementation.

The present invention therefore provides a method and a test device for performing packet error rate (PER) measurement on a Bluetooth Low Energy channel with the features of the independent claims. Further advantageous embodiments are subject matter of the dependent claims.

According to a first aspect, a method for performing PER measurement on a BLE channel is provided. The method comprises, establishing an isochronous BLE connection between a test device and an implementation under test (IUT). The method further comprises measuring a PER on the established isochronous BLE connection between the test device and the IUT.

According to a further aspect, a test device for performing PER measurement on a BLE channel is provided. The test device comprises a transceiver and an analyzer. The transceiver is configured to establish an isochronous BLE connection between the test device and an implementation under test (IUT). The analyzer is configured to measure a PER on the established isochronous BLE connection between the test device and the IUT.

Measurement of an error rate such as a packet error rate (PER) is a helpful and valuable information for assessing a link quality. For example, reception properties and/or transmission properties of an implementation under test may be assessed based on an error rate such as PER. It is therefore desirable to have an appropriate tool for measuring a PER. In particular, it is desirable to have a tool for measuring a PER on an isochronous channel of a BLE connection. However, there is still no standardized procedure for measuring a PER on a BLE connection, in particular on a BLE isochronous channel.

The present invention therefore takes into account this finding and aims to provide a method and a test device for measuring an error rate, in particular a packet error rate on BLE connection, especially on a BLE isochronous channel.

In order to perform a PER measurement on a BLE channel, especially on a BLE isochronous channel, a BLE isochronous connection is established between a test device and an implementation under test. After establishing the BLE isochronous connection, the test device may transmit test data packets and receive for each transmitted test data packet a response from the implementation under test (IUT). Accordingly, if the test device receives such a response from the implementation under test, the test device may consider that the respective test data packet is successfully transmitted via the established BLE isochronous connection. Otherwise, if the test device does not receive a confirmation response relating to a transmitted test data packet, the test device may consider that there is an error in the transmission link used for transmission for this test data packet. Accordingly, the test device may calculate a PER based on the ratio between the successfully received responses from the implementation under test and the total number of test data packets transmitted to the implementation under test. In this way, a PER value can be calculated for the BLE isochronous channel established between the test device and the IUT.

The IUT may be any kind of communication device comprising a BLE unit for establishing a Bluetooth connection, in particular a BLE connection with a communication partner. The IUT may be a BLE implementation which can establish a BLE isochronous communication.

The test device may comprise appropriate components for establishing a BLE connection, in particular a BLE isochronous connection with the IUT. For this purpose, the test device may comprise radio frequency (RF) components for emitting radio frequency signals and receiving radio frequency signals in a frequency range used for Bluetooth communication. Further to this, the test device may comprise processing elements for generating data packets transmitted via the RF communication link to the IUT and for processing data packets received from the IUT via the RF communication link. Further to this, the test device may comprise processing elements for determining the PER based on the transmitted test data packets and the received response data from the IUT. However, it is understood, that the test device may comprise any other kind of appropriate components for establishing the Bluetooth communication link between the test device and the IUT, and for processing data transmitted via the established communication.

Further to this, the test device may comprise any kind of interfaces for receiving commands in order to set up or operate the test device and/or output measurement results or a current configuration of the test device. For this purpose, the test device may comprise interfacing elements such as a network interface for communicatively coupling the test device with a further device and/or a user interface such as a keyboard and/or a display for interaction with a user.

Further embodiments of the present invention are subject of the further subclaims and of the following description, referring to the drawings.

In a possible embodiment, the isochronous BLE connection between the test device and the IUT is established by first establishing an Asynchronous Connection-Less (ACL) connection. ACL usually is used for general data frames. Subsequently a Connected Isochronous Stream is established between the test device and the IUT.

In a possible embodiment, the measuring of the PER comprises sending test data packets from the test device to the IUT and receiving, by the test device, response data packets from the IUT. In particular, a separate response data packet is sent from the IUT for each test data packet received by the IUT. Accordingly, the test device may receive a separate response data packet for each test data packet which has been sent to the IUT. Further, the PER may be calculated based on the number of test data packets sent by the test device and the number of response data packets received by the test device. For example, a PER value may be calculated by:

1−(number of received response data packets/number of test data packets sent by the test device).

In a possible embodiment, the response data packets may comprise an acknowledgment (ACK) or a negative-acknowledgment (NACK). The ACK or NACK may be sent by the IUT in response to a test data packet received from the test device.

In a possible embodiment, the test data packets may be data packets of a Connected Isochronous Stream (CIS). A CIS may be used, for example, for transmitting audio data.

In a possible embodiment, the test data packets and the response data packets may be transmitted in time slots of a predetermined time grid. A response data packet related to a specific test data packet may be received in a time slot immediately following a time slot in which the specific test data packet is transmitted. Accordingly, no empty data packets may be transmitted or received between the transmission of the test data packet and the corresponding response data packet With the present invention it is therefore possible to perform a measurement of error rates, in particular a measurement of a packet error rate (PER) for a Bluetooth Low Energy (BLE) implementation. In particular, a PER can be measured for BLE isochronous transmission channels.

BRIEF DESCRIPTION OF THE DRAWINGS

For a more complete understanding of the present invention and advantages thereof, reference is now made to the following description taking in conjunction with the accompanying drawings. The invention is explained in more detail below using exemplary embodiments, which are specified in the schematic figures and the drawings, in which:

FIG. 2: shows a table illustrating transmission of data packets;

FIG. 3: shows a table illustrating a transmission of data packets in an isochronous BLE connection according to an embodiment;

Figure 1:
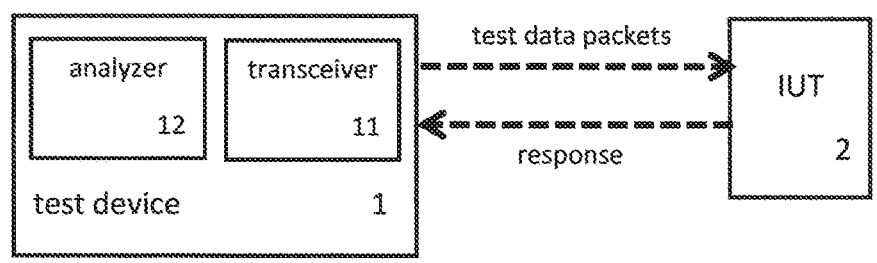
FIG. 1: shows a schematic diagram of a test arrangement with a test device according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a schematic diagram of a test arrangement for measuring an error rate of a data transmission between an implementation under test (IUT) 2 and a test device 1 according to an embodiment. The test device 1 comprises at least a transceiver 11 and an analyzer 12. It is understood, that the test device 1 may comprise any further components such as interfaces for receiving and/or transmitting data to/from a further device and/or a user.

The transceiver 11 of the test device 1 may comprise appropriate components for generating radio frequency (RF) signals and emitting the generated RF signals. In particular, the generated RF signals may be transmitted to the IUT 2. Further, transceiver 11 may receive RF signals, especially RF signals from the IUT 2.

Accordingly, the IUT 2 may receive RF signals from the transceiver 11 of the test device 1. Further, the IUT 2 may emit RF signals which are received by transceiver 11 of the test device 1. The RF signals which are transmitted and received between the test device 1 and the IUT 2 may relate to RF signals of a Bluetooth communication, in particular to a Bluetooth Low Energy (BLE) communication. In this way, test device 1 may establish a BLE connection between the test device 1 and the IUT 2. The established connection between the test device 1 and the IUT 2 may be established via a wireless RF communication link. However, it may be also possible to couple a connector of the test device 1, in particular of the transceiver 11, with a terminal or connector of the IUT 2 by means of a cable. In this way, a wired RF connection may be established between the test device 1 and the IUT 2. In particular, such a wired connection may be connected to a terminal of IUT 2 which is usually connected with an antenna for receiving and emitting RF signals.

Analyzer 12 of the test device 1 may control the operation of the test device 1, in particular of transceiver 11. For this purpose, analyzer 12 may generate data which are provided to transceiver 11. Transceiver 11 may receive digital data from analyzer 12 and generate RF signals according to the received digital data. For example, the RF signals may be transmitted in form of RF PHY packets. For this purpose, transceiver 11 may comprise appropriate elements such as modulators, RF signal sources, mixers, amplifiers, filters etc. Furthermore, transceiver 11 may receive RF signals, e.g. RF PHY packets, and provide appropriate digital data to analyzer 12 according to the received RF signals. In particular, a packet-based communication between the test device 1 and the IUT 2 may be established.

In this way, test device 1 may establish an isochronous BLE connection between the test device 1 and IUT 2. An isochronous BLE connection may be a time synchronized connection, for example a connection for a time synchronized audio channel as defined by the present BLE standard.

After establishing a BLE isochronous connection, the test device 1 may perform measurements for determining a PER on the established isochronous BLE connection.

For this purpose, the test device 1 may send test packets on the established isochronous BLE connection to the IUT 2. IUT 2 may receive a test packet transmitted by the test device 1, and in response to a received test packet, IUT 2 may send a response data packet to the test device 1 on the established isochronous BLE connection. If desired, the IUT 2 may check the received test data package before sending the response data packet. For example, a checksum of the received test data packet may be verified or any other appropriate check may be performed.

Accordingly, test device 1 may receive the response data package. Based on the received response data packet, test device 1 may determine a correct transmission of the test data package. Otherwise, if test device 1 does not receive a response data packet corresponding to a transmitted test data package, test device 1 may determine an error in connection with the respective test data package. In this way, analyzer 12 of test device 1 can determine a packet error rate (PER) based on the ratio of received response data packages and the total number of transmitted test data packages. For example, the PER may be calculated as follows:

PER [%]=(1−(number of received response data packages/number of transmitted test data packages))×100%

In this way, a measure of an error rate, in particular of a PER can be determined even though such a determination of a PER is not foreseen in conventional BLE standard, in particular for isochronous BLE connections.

The response data packages returned by the IUT 2 in response to received test data packages may be, for example a returned acknowledgement (ACK) or negative-acknowledgement (NACK) which is sent back by the IUT 2 in response to a received test data package. Accordingly, analyzer 12 of test device 1 can determine the PER based on the ratio of received ACK/NACK and the number of corresponding test data packages which have been sent to the IUT 2.

The PER can be determined, for example, based on a predetermined number of test data packages which are sent from the test device 1 to the IUT 2. Alternatively, it may be also possible to determine PER based on the number of test data packages which are sent to the IUT 2 within a predetermined period of time.

Figure 2:
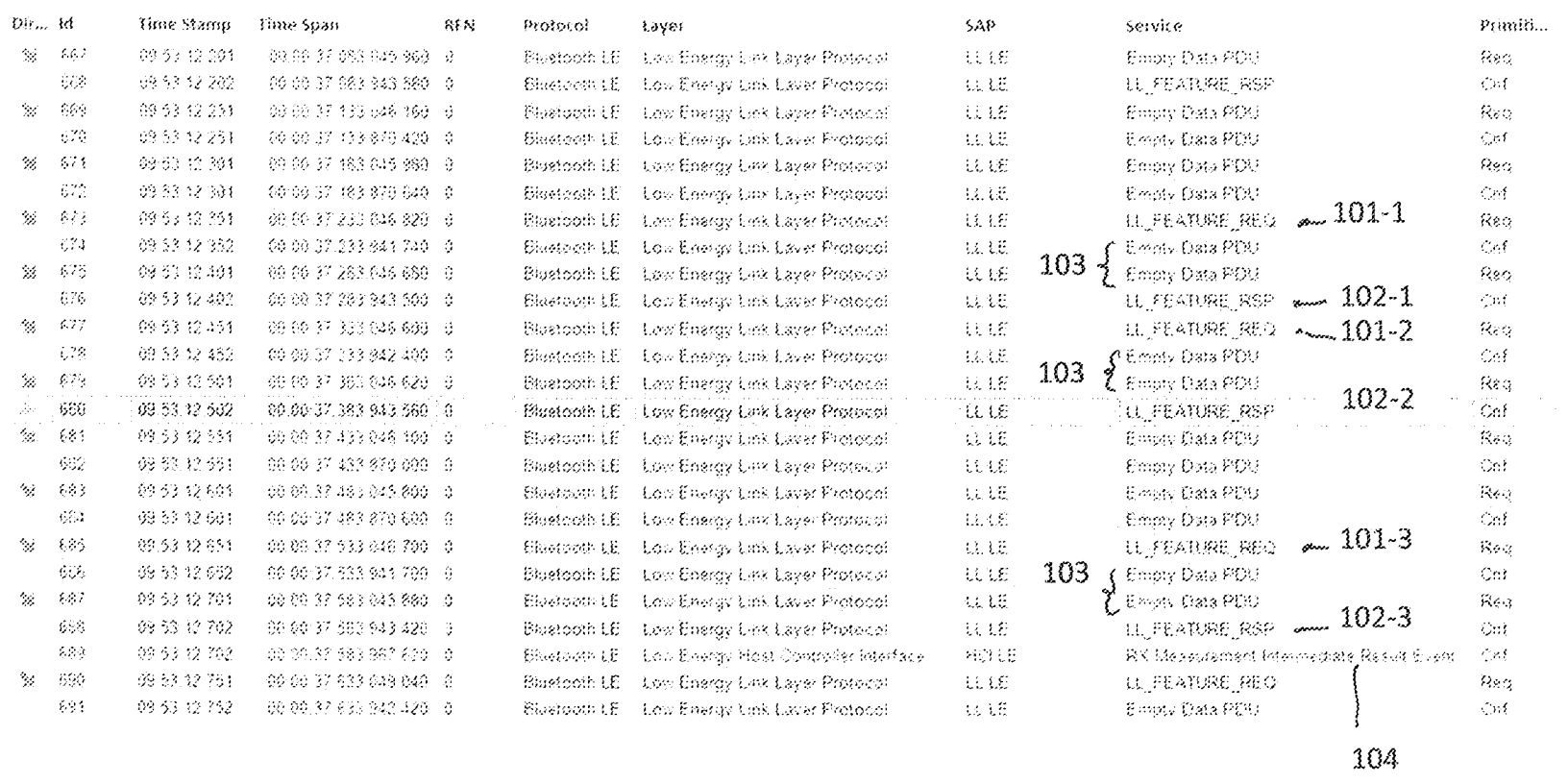

FIG. 2 shows a table illustrating data transmission between a test device 1 and an IUT 2 by a BLE connection in a so-called "connected mode". As can be seen in this table, the data transmission may be based on a transmission of data packets in time slots of a predetermined time grid. In each time slot a request from the test device 1 to the IUT 2 may be transmitted or a confirmation may be received from the IUT 2 to the test device 1. The data transmission may also comprise empty data 103-*i*.

In a connected mode, there may be one or more empty data packets 103-1 between a transmission of a first test data packet 101-1 and the corresponding response data packet 102-1. A transmission of a test data packet 101-*i* may be even successful if a related response data packet 102-*i* is received, if there are empty data packets 103-*i* between the test data packet 101-*i* and the corresponding response data packet 102-*i*.

Figure 3:
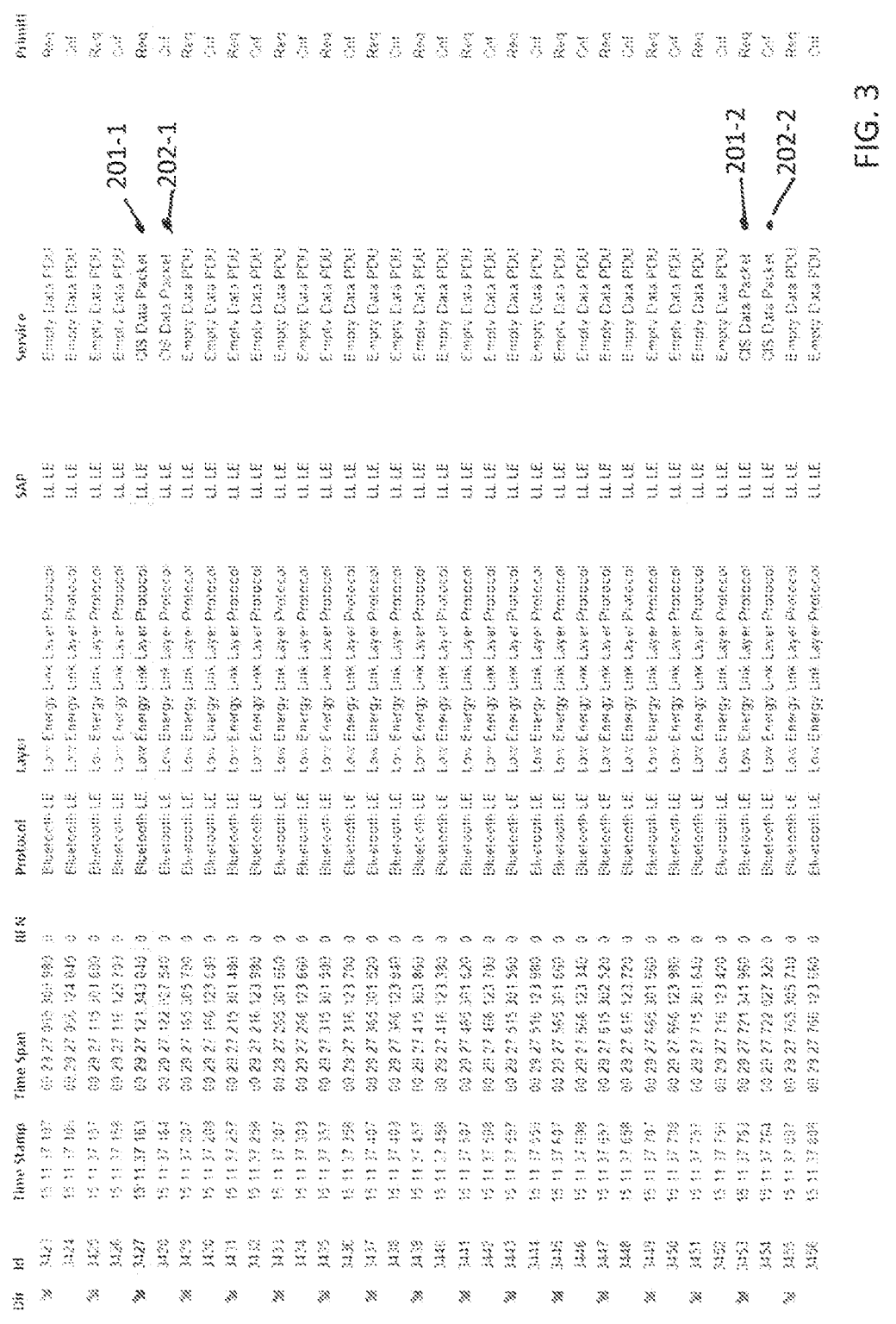

FIG. 3 shows a table illustrating a transmission of data packets on an established isochronous BLE connection. The isochronous BLE connection may relate to an isochronous BLE connection in a so-called "audio mode". In this mode, the test device 1 sends a connected isochronous stream (CIS) data packet to the IUT 2, and the IUT 2 replies with a further CIS data packet. This process is repeated. In contrast to the above described "connected mode" operation, no empty packets are exchanged between related CIS data packets in the "audio mode".

As can be seen in FIG. 3, that in response to a CIS data packet 201-*i* sent from the test device 1 to the IUT 2, the IUT 2 immediately responds with a further CIS data packet 202-*i*. No empty data packets exist between the data packet 201-*i* sent from the test device 1 and the response CIS data packet 202-*i* sent from the IUT 2.

After a predetermined number of test data packets 201-*i* have been transmitted or a predetermined period of time has been elapsed, a determination of a PER may be performed.

Thus, an analysis of the quality of an established isochronous BLE channel can be performed by determining a PER value. However, it should be noted that this analysis may only provide information regarding a packet error rate (PER) rather than a more detailed bit error rate (BER), since only a confirmation of the transmitted test data packets is evaluated based on the corresponding response packets.

The PER can be determined based on the number of CIS data packets sent from the test device 1 to the IUT 2 and the related number of CIS data packets received by the test device 1 from the IUT 2.

Figure 4:
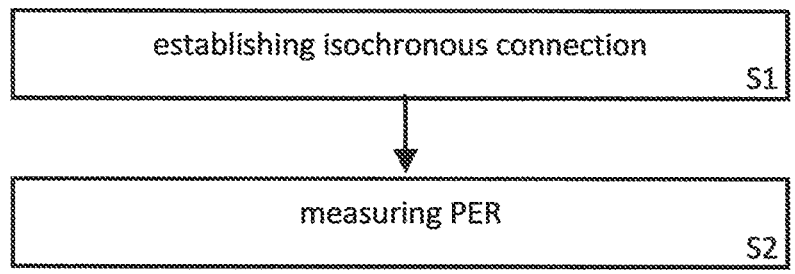
FIG. 4: shows a flow diagram of a test method according to an embodiment.

FIG. 4 shows a flow diagram illustrating a method for performing packet error rate (PER) measurement on a Bluetooth Low Energy (BLE) channel. It is understood, that the methods as described in the following may comprise any step for performing an operation as described above in connection with the described test arrangement. Accordingly, the above-described test arrangement may comprise any component for performing an operation as will be described in connection with the test methods below.

The method for performing PER measurement on a BLE channel may comprise a step S1 of establishing an isochronous BLE connection between a test device 1 and an implementation under test (IUT) 2.

After the isochronous BLE connection has been established between the test device 1 and the IUT 2, a measurement of a PER may be performed in step S2. The PER measurement may be performed on the established isochronous BLE connection between the test device 1 and the IUT 2. In particular, the PER may be calculated based on a ration between the received response data packets and a total number of transmitted test data packets.

Figure 5:
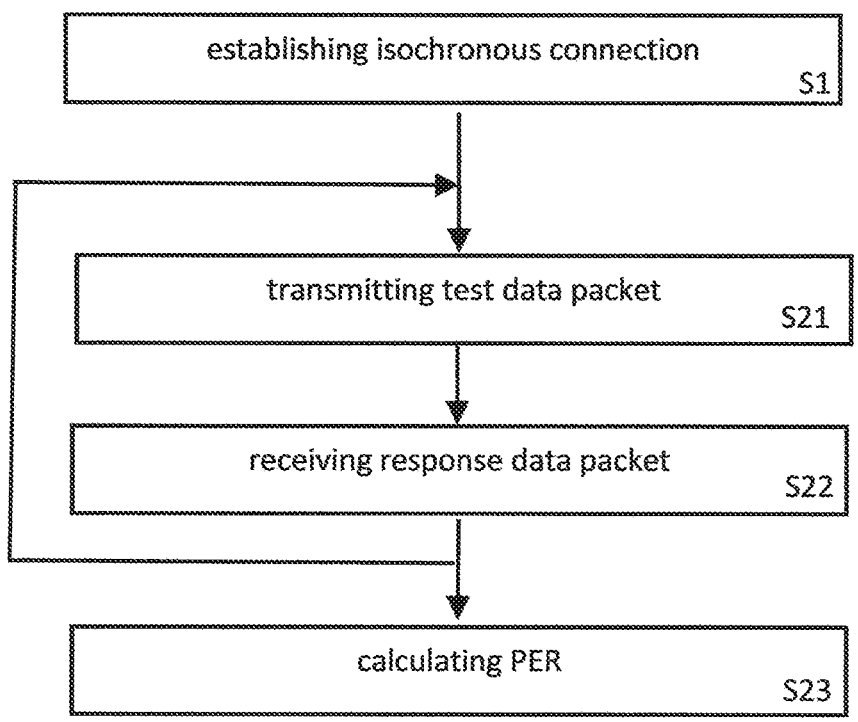
FIG. 5: shows a flow diagram of a test method according to another embodiment.

FIG. 5 shows a flow diagram illustrating the measurement of the PER in more detail.

After establishing the isochronous BLE connection between the test device 1 and the IUT 2 in step S1, the measurement of the PER may be performed as follows:

In step S21 the test device 1 transmits a test data packet. The test data packet may be received by the IUT 2 and in response to the received test data packet, the IUT 2 may reply with a response data packet.

Accordingly, test device 1 may receive in step S22 the response data packet from IUT 2.

The transmission of test data packets in step S21 and the reception of response data packets in step S22 may be repeated for a predetermined number of test data packets or a predetermined period of time. However, any other criterion for repeating the transmission and reception in steps S21 and S22 may be also applied.

Finally, in step S23 a PER value may be calculated. The PER may be calculated based on the number of test data packets sent from the test device 1 to the IUT 2 and the number of related response data packets received from the IUT 2 by the test device 1.

As already mentioned above, the PER may be calculated as

1−(number of received response messages/number of transmitted test data packages).

Summarizing, the present invention relates to an analysis of a Bluetooth Low Energy implementation. In particular, a packet error rate (PER) is determined for a communication channel between the BLE implementation and a test device. For this purpose, the test device sends test packets to the BLE implementation. The BLE implementation returns response messages which are received by the test device. Accordingly, a PER value can be determined based on a ratio between the successfully received response messages from the BLE implementation and the total number of test packets sent to the BLE implementation.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 1 test device
2 implementation under test
11 transceiver
12 analyzer
101-$i$, 201-$i$ test data packets
102-$i$, 202-$i$ response data packets
103-$i$ empty packets

The invention claimed is:

1. A method for performing packet error rate (PER) measurement on a Bluetooth Low Energy (BLE) channel, the method comprising:
    establishing an isochronous BLE connection between a test device and an implementation under test (IUT);
    sending, by the test device, test data packets from the test device to the IUT;
    receiving, by the test device, response data packets from the IUT, wherein a separate response data packet is sent from the IUT for each test data packet received by the IUT; and
    measuring a PER on the established isochronous BLE connection between the test device and the IUT,
    wherein the test data packets and the response data packets are transmitted in time slots of a predetermined time grid, and there is one or more empty data packets between a transmission of the a test data packet and a corresponding response data packet.

2. The method of claim 1, wherein establishing the isochronous BLE connection between the test device and the IUT comprises establishing an Asynchronous Connection-Less (ACL) connection between the test device and the IUT and subsequently establishing a Connected Isochronous Stream between the test device and the IUT.

3. The method of claim 1, wherein measuring the PER includes:
    calculating the PER based on a number of test data packets sent by the test device and a number of response data packet received by the test device.

4. The method of claim 3, wherein calculating the PER comprises calculating a ratio between a number of test packets transmitted by the test device and a number of response data packets related to the test packets transmitted by the test device.

5. The method of claim 3, wherein the response data packets comprise an acknowledgment (ACK) or a negative-acknowledgment (NACK), sent by the IUT in response to a test data packet received from the test device.

6. The method of claim 1, wherein the test data packets are data packets of a Connected Isochronous Stream (CIS).

7. A test device for performing packet error rate (PER) measurement on a Bluetooth Low Energy (BLE) channel, the test device comprising:
    a transceiver for establishing an isochronous BLE connection between the test device and an implementation under test (IUT); and
    an analyzer coupled to the transceiver to control the transceiver and exchange digital data with the transceiver for measuring a PER on the established isochronous BLE connection between the test device and the IUT,
    wherein the transceiver is configured to send test data packets from the test device to the IUT, receive response data packets from the IUT generated according to digital data received from the analyzer, wherein a separate response data packet is sent from the IUT for each test data packet received by the IUT,
    wherein the test data packets and the response data packets are transmitted in time slots of a predetermined time grid, and there is one or more empty data packets between a transmission of the a test data packet and a corresponding response data packet, and
    wherein the analyzer is configured to calculate, based on the digital data exchanged with the transceiver, the PER based on a number of test data packets sent by the test device and a number of response data packet received by the test device.

8. The test device of claim 7, wherein the transceiver is configured to establish an Asynchronous Connection-Less (ACL) connection between the test device and the IUT between the test device and the IUT, and subsequently establish a Connected Isochronous Stream between the test device and the JUT.

9. The test device of claim 7, wherein the received response data packets comprise an acknowledgment (ACK) or a negative-acknowledgment (NACK), sent by the IUT in response to a test data packet received from the test device.

10. The test device of claim 7, wherein the analyzer is configured to calculate a ratio between a number of test packets transmitted by the test device and a number of response data packets related to the test packets transmitted by the test device.

11. The test device of claim 7, wherein the test data packets are data packets of a Connected Isochronous Stream (CIS).

* * * * *